US009567165B2

(12) United States Patent
Clüsserath

(10) Patent No.: US 9,567,165 B2
(45) Date of Patent: Feb. 14, 2017

(54) TRANSPORT DEVICE FOR CONTAINERS

(71) Applicant: KHS GmbH, Dortmund (DE)

(72) Inventor: Ludwig Clüsserath, Bad Kreuznach (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 14/785,693

(22) PCT Filed: Apr. 10, 2014

(86) PCT No.: PCT/EP2014/000960
§ 371 (c)(1),
(2) Date: Oct. 20, 2015

(87) PCT Pub. No.: WO2014/173500
PCT Pub. Date: Oct. 30, 2014

(65) Prior Publication Data
US 2016/0068355 A1    Mar. 10, 2016

(30) Foreign Application Priority Data

Apr. 23, 2013 (DE) .................. 10 2013 104 082

(51) Int. Cl.
*B65G 47/84*     (2006.01)
*B65G 29/00*     (2006.01)
*B65G 47/86*     (2006.01)

(52) U.S. Cl.
CPC ............ *B65G 47/847* (2013.01); *B65G 29/00* (2013.01); *B65G 47/846* (2013.01); *B65G 2201/0244* (2013.01); *B65G 2811/0636* (2013.01)

(58) Field of Classification Search
CPC ..... B65G 29/00; B65G 47/846; B65G 47/847; B65G 2201/0244; B65G 2811/0636
USPC ....... 198/803.3, 459.2, 803.14, 473.1, 479.1, 198/480.1
See application file for complete search history.

(56) References Cited

U.S. PATENT DOCUMENTS

| 7,967,127 B2 | 6/2011 | Spence | |
| 2010/0003112 A1 | 1/2010 | Rognoni et al. | |
| 2010/0193331 A1* | 8/2010 | McAllister | B65G 47/846 198/473.1 |
| 2011/0272245 A1* | 11/2011 | Papsdorf | B65G 47/846 198/471.1 |
| 2013/0180830 A1* | 7/2013 | Orndorff | B65G 21/2072 198/617 |

FOREIGN PATENT DOCUMENTS

| CN | 87104629 | 5/1988 |
| CN | 1108207 | 9/1995 |
| CN | 102883977 | 1/2013 |

(Continued)

*Primary Examiner* — Mark A Deuble
(74) *Attorney, Agent, or Firm* — Occhiuti & Rohlicek LLP

(57) ABSTRACT

A container transport device includes a drive driving a star wheel mounted on bearings within a hollow column that is part of the machine frame. The star wheel comprises two star wheel elements, one forming the leading flanks and the other forming trailing flanks. The two elements adjust to define an angular offset between them. During transport, the elements rotate synchronously while maintaining the angular offset. The hollow column encloses all function elements for setting or maintaining an angular offset, thus protecting them from exterior influence.

19 Claims, 3 Drawing Sheets

(56) References Cited

FOREIGN PATENT DOCUMENTS

| | | |
|---|---|---|
| DE | 26 23 309 | 12/1977 |
| DE | 85 32 911 | 1/1986 |
| DE | 10 2008 001 285 | 10/2009 |
| DE | 20 2010 011 097 | 1/2011 |
| DE | 10 2010 049 406 | 4/2012 |
| EP | 0 629 569 | 12/1994 |
| EP | 1 529 745 | 5/2005 |
| EP | 2 338 813 | 6/2011 |
| WO | WO 97/45347 | 12/1997 |

* cited by examiner

TRANSPORT DEVICE FOR CONTAINERS

RELATED APPLICATIONS

Under 35 USC 371, this application is the national stage of international application PCT/EP2014/000960, filed on Apr. 10, 2014, which claims the benefit of the Apr. 23, 2013 priority date of German application DE 102013104082.9, the contents of which are herein incorporated by reference.

FIELD OF INVENTION

The invention relates to container processing, and in particular, to a transport device for transporting containers.

BACKGROUND

Known devices for transporting containers include transport stars with receptacles for engaging containers. Since containers come in different sizes, it is useful to be able to adjust the sizes of these receptacles to accommodate containers of different sizes.

Known adjustment mechanisms have the disadvantage of having parts that are exposed to outside influence during operation of the transport star. This tends to make it difficult to maintain proper adjustment. In particular, known adjustment, fixing, and/or clamping mechanisms are prone to disruption, for example by being jammed with glass shards.

These components are also located in a hygienic region of a system for filling containers. Unfortunately, they are difficult to clean. As a result, this arrangement is particularly disadvantageous if it is intended that the containers should be filled with microbiologically sensitive and easily contaminated beverages or other foodstuffs.

SUMMARY

Among the objects of the invention is that of providing a container-transport device that avoids the above disadvantages, and that also permits simplified cleaning with a high degree of operational reliability.

With the transport device according to the invention, the function elements that are required for adjustment of the container receptacles to different container diameters, i.e. for the adjustment setting and/or maintaining of the corresponding angular offset between the at least two transport star elements, and also the bearing arrangement of the transport star elements and the drive units are safely ensconced within a machine frame or a column thereof, fully protected against the outside.

In one aspect, the invention features a transport device for transporting a container. Such a transport device includes a star wheel mounted on bearings within a column that is part of a machine frame, a drive that drives the star wheel about an axis perpendicular to a plane defined by the star wheel, and a plurality of receptacles, each of which receives a container to be transported. These receptacles are disposed circumferentially about the star wheel. A first flank and a second flank together define a corresponding receptacle. The first flank is a leading flank that leads in relation to a rotation direction of the star wheel. The second flank is a trailing flank that trails the leading flank in relation to the rotation direction of the star wheel. The star wheel has first and second star wheel elements, of which the first star wheel element forms the leading flanks and the second star wheel element forms the trailing flanks. These star wheel elements are adjustable about the axis to define an angular offset between the first and second star wheel elements. This angular offset governs the size of each receptacle. During container transport, the drive rotates the first and second star wheel elements synchronously in a common direction while maintaining the angular offset. The column has a hollow portion that defines a first space, which is inside the column, and a second space, which is outside the column. Within the first space is a function element set that includes one or more function elements necessary for either setting the angular offset, maintaining the angular offset, or both. As a result, the column protects the function element set from the second space and vice versa.

In some embodiments, the star wheel elements comprise plates.

In other embodiments, the bearings comprise first bearings and second bearings mounted independently of each other. Both the first and second bearings are disposed within the first space.

In some embodiments, the drive includes a first and second electric motors for driving the first and second star wheel elements respectively. Both motors are in the first space so that they are isolated from the second space. Among these embodiments are those in which the star wheel elements connect to and rotate with corresponding coaxial first and second shafts. The second shaft has a hollow shaft section that surrounds the first shaft. The second electric motor has a stator winding that is disposed in an interior of the column to interact with a permanent magnet arrangement arranged in the second shaft. Also among these embodiments are those in which either the first or second electric motor functions is an angular-offset adjustment motor for adjusting an angular offset between the first and second star wheel elements, those in which the two motors are driven synchronously in a common direction so as to maintain a constant angular offset between the two star wheel elements, and those in which the motors move their respective star wheel elements relative to the column.

Some embodiments include a rigid coupling between the first star wheel element and the second star wheel element for maintaining a constant angular offset between the first star wheel element and the second star wheel element. Among these are those in which the rigid coupling is accommodated within the first space so as to be protected from activity in the second space.

Other embodiments that include such a rigid coupling include those in which the rigid coupling switches between a first state, in which the star wheel elements are coupled, and a second state, in which they are not. In the second state, the star wheel elements move independently of each other.

In some embodiments, a rigid coupling couples the star wheel elements by coupling the first and second shafts. Among these are embodiments in which the rigid coupling transitions between a first state, in which the shafts are coupled, and a second state, in which the shafts are decoupled.

In all cases that include a rigid coupling, that coupling can be mechanical, pneumatic, or electrical.

Also among the embodiments are those that include an actuation device and a gripper arrangement that includes a gripper arm. The gripper arrangement secures the container in one of the receptacles. The actuating device moves the gripper arm between a first state and a second state. In the second state, the gripper arm secures the container in the receptacle, and in the first state, the gripper arm leaves the container unsecured. Among these embodiments are those in which the gripper arrangement is disposed on a star wheel element that forms one of the second flanks, and those in which the gripper arm is pivotable between a first state in which the gripper arm trails an associated receptacle and a second state in the gripper arm engages behind the container and secures the container to the receptacle. The gripper arm rotates in the direction of rotation of the star wheel when pivoting from the first position to the second position.

As used herein, a "transport star wheel" or a "star wheel" refers to a rotating transporter that has container receptacles on its circumference, each of which lies between a leading flank and a trailing flank. Each receptacle is open in the radial direction so that a container can be at least partially accommodated within the container receptacle. Once accommodated, the trailing flank pushes against the container, thus causing the container to move with the transport star wheel.

As used herein, the term "container" includes cans, and bottles, tubes, pouches, whether made of metal, glass, and/or plastic, as well as other packing media suitable for the filling of products that are powdered, granulated, or fluid form, and in the latter case, regardless of viscosity thereof.

As used herein, terms such as "essentially" or "approximately" are intended to include deviations from an exact value by ±10%, preferably by ±5%, and/or deviations in the form of changes that are not of significance for the function.

Further embodiments, advantages, and possible applications of the invention can also be derived from the following description of embodiments and from the figures. In this context, all the features described and/or represented as images are basically the object of the invention, taken alone or in any desired combination, irrespective of their integration in the claims or references made to them. The contents of the claims are also deemed to be constituent parts of the description.

DESCRIPTION OF THE DRAWINGS

These and other features of the invention will be apparent from the following detailed description and the accompanying figures, in which.

DETAILED DESCRIPTION

Figure 1:
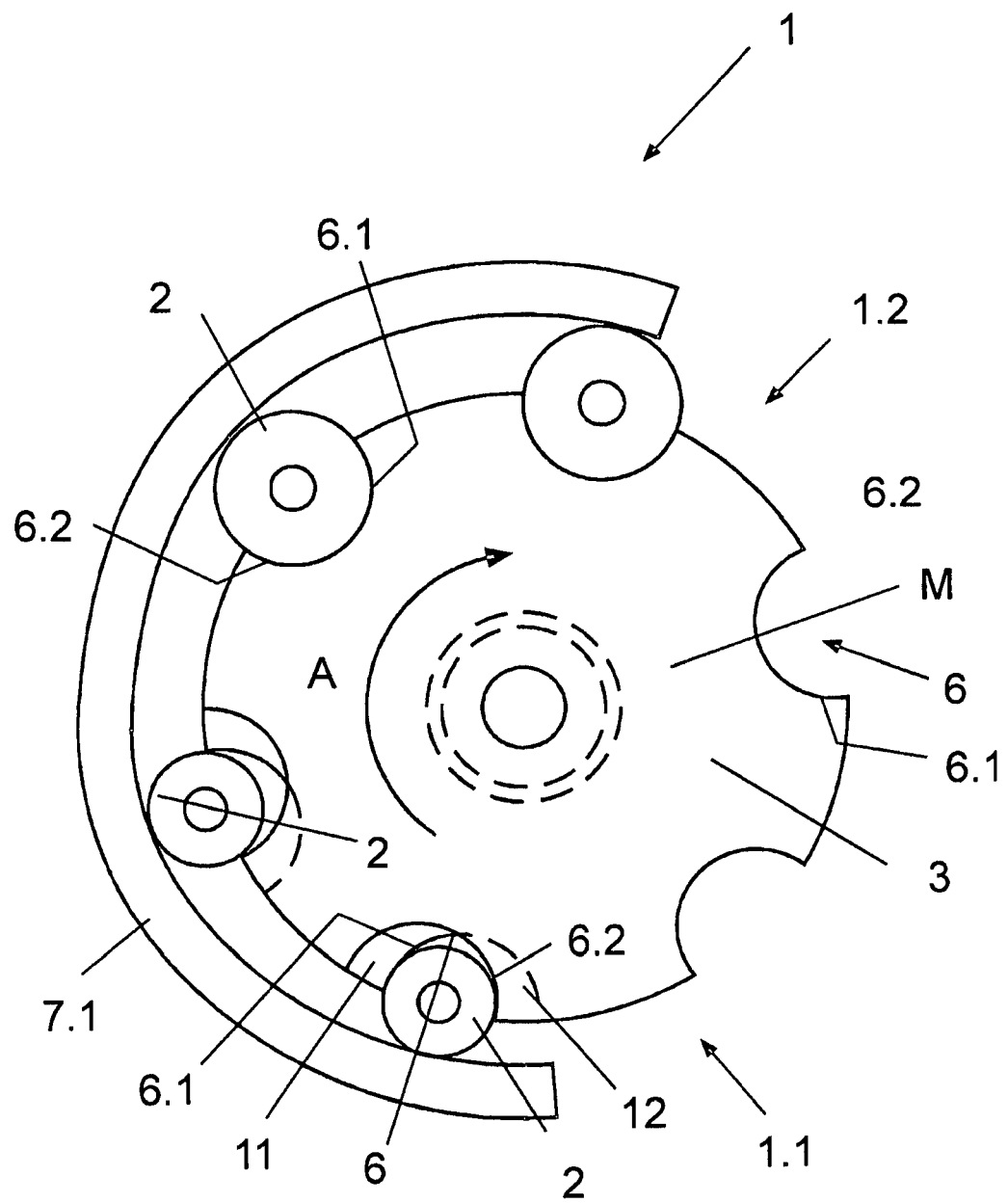
FIG. 1 shows a transport star wheel for the transporting of containers, in particular bottles.
Figure 2:
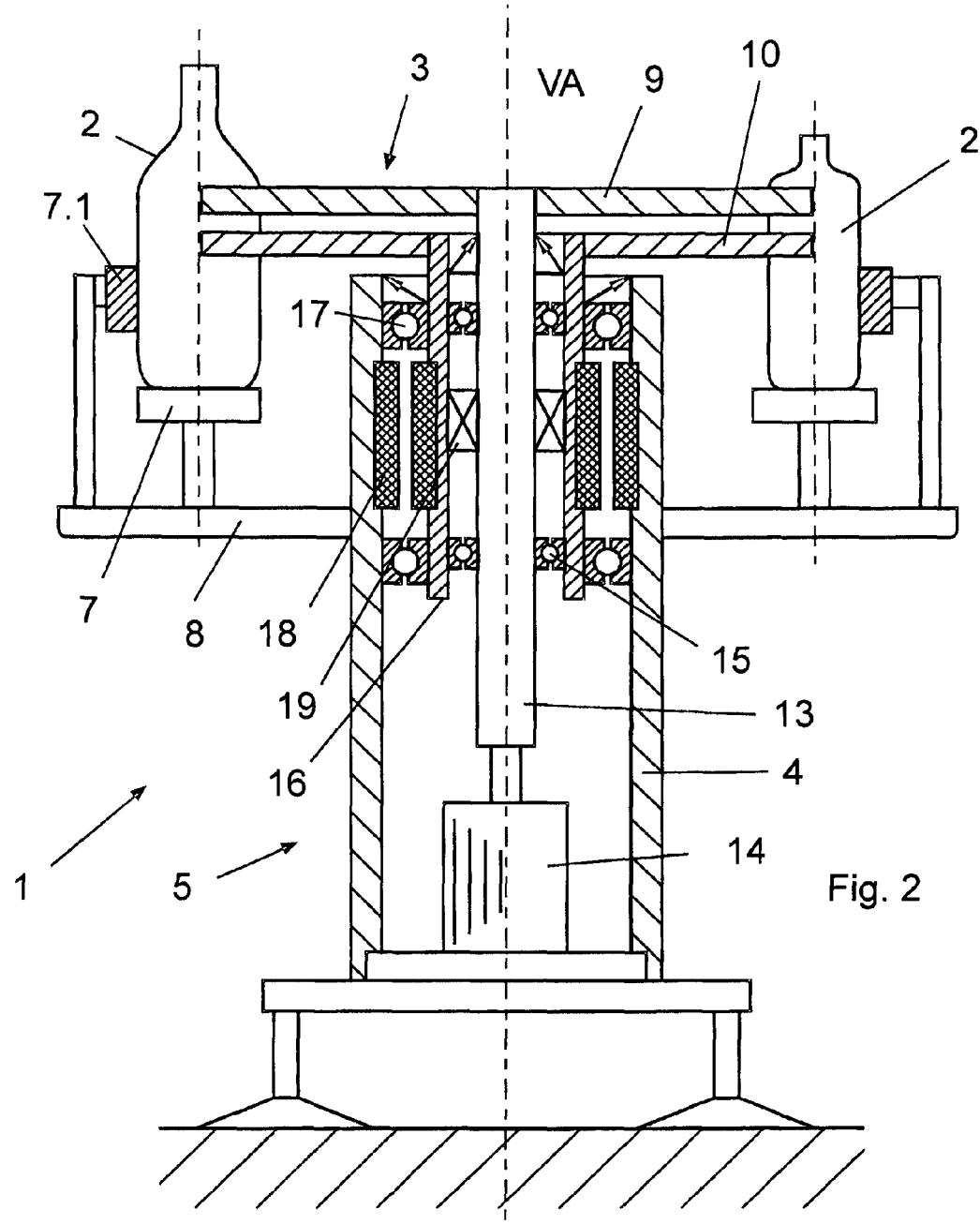
FIG. 2 is a vertical section of the transport device from FIG. 1.

FIGS. 1 and 2 show a transport device 1 that transports containers 2 between a container inlet 1.1 and a container outlet 1.2. In the embodiment shown, the transport device 1 includes a transport star wheel 3. The transport device 1 is suitable for many kinds of containers 2, including bottles.

The transport device 1 is used as a component of a container handling system. Exemplary applications include, but are not limited to transferring the containers 2 from an outside transport element to handling positions of a container handling machine, such as a filling machine, and transferring containers 2 from one handling machine to a further handling machine or to a further transport element of the container handling system.

The transport star wheel 3 rotates in a rotation direction A about a vertical axis VA. As shown in FIG. 2, a hollow column 4 of a machine frame 5 supports the transport star wheel 3. Container receptacles 6 are distributed around a circumference of the transport star wheel 3 at uniform angular intervals about the vertical axis VA, as shown in FIG. 1. Each container receptacle 6 comprises a pocket that opens radially outward.

Referring now to FIG. 2, containers 2 stand upright with their bases resting on a sliding strip 7 and with their container axes parallel to the vertical axis VA. A carrier element 8 projecting radially outward from the hollow column 4 supports the sliding strip 7. The sliding strip 7 and accompanying outer guide rails 7.1 form an arc about the vertical axis VA between the container inlet 1.1 and the container outlet 1.2, as shown in FIG. 1.

For each container receptacle 6, the rotation direction A defines a leading flank 6.1 and a trailing flank 6.2. The trailing flank 6.2 pushes the container along as the star wheel 3 rotates in the rotation direction A to bring the container 2 from the container inlet 1.1 to the container outlet 1.2 of the transport device 1.

Each container receptacle 6 has an associated vertical middle plane M that includes the vertical axis VA. The middle plane M bisects the container receptacle 6. Ideally, when a container is in a receptacle, its axis lies in the vertical middle plane M.

Referring to FIG. 2, the transport star wheel 3 includes first and second star plates 9, 10 that are vertically offset relative to each other. The first and second star plates 9, 10 have corresponding first and second pockets 11, 12 that open radially outward. These first and second pockets 11, 12 are best seen in FIG. 1, along their respective circumferences of the first and second star plates 9, 10. Hidden portions of a pocket are shown in dashed lines. Although only two star plates are described, more than two star plates can be used.

Depending on the angular offset between the first and second star plates 9, 10, the first pockets 11 will overlap the second pockets 10 by differing extents. The extent of the overlap defines the container receptacle 6 with its leading flank 6.1 and its trailing flank 6.2. The leading flank 6.1 is a leading edge of a first pocket 11 whereas the trailing flank 6.2 is a trailing edge of a second pocket 12.

Because the first and second star plates 9, 10 can move independently of each other about the vertical axis VA, it is possible to adjust the angular offset between them. Adjusting the angular offset amounts to adjusting the size of the container receptacles 6 to conform to the diameter of the containers 2 in a sectional plane defined by the first and second star plates 9, 10. This adjustment also makes it possible to retain an angle setting of a middle plane M of each container receptacle 6.

In the particular embodiment shown in FIG. 2, the first star plate 9 is above the second star plate 10. An upper end of a first shaft 13 that is arranged coaxially with the vertical axis VA supports the first star plate 9. A lower end of the first shaft 13 couples to a first motor 14 located inside the hollow column 4. In the illustrated embodiment, the first motor 14 is a servomotor.

The first shaft 13 is mounted so that it can rotate on inner bearings 15 within a hollow second shaft 16 that concentrically encloses the first shaft 13. The second shaft 16, in turn, is mounted so that it can rotate on outer bearings 17 within the interior of the hollow column 4.

A second motor 18 is placed between the second shaft 16 and either the hollow column 4 or the machine frame 5. The second motor 18 is a drive motor, such as a torque motor. In one embodiment, the second motor 18 has a stator winding provided within the interior of the hollow column 4 and a permanent magnet arrangement arranged at the second shaft 16.

A coupling 19 couples the first shaft 13 and the second shaft 16. When coupled, the first shaft 13 rigidly connects with the second shaft 16. The coupling 19 can be a mechanical, electrical, and/or pneumatic coupling.

Instead of the coupling 19, other mechanical coupling and/or connections can be provided to fix the angular offset of the first and second star plates 9, 10 relative to each other. In particular, some embodiments include a mechanical means with an angular offset that is adjusted to some value and that can be secured so that the value does not change. Such a mechanical means can be used instead of or in addition to the coupling 19.

The first motor 14 and/or the second motor 18 make it possible to adjust the container receptacles 6 to conform to a diameter of containers 2 that are to be transported. This is achieved by turning the first and second star plates 9, 10 relative to one another. Preferably, this includes maintaining the location of the middle plane M of the container receptacles 6.

Once the container receptacles 6 have been adjusted to conform to the diameters of the containers 2, the first and second motors 14, 18, of the transport star wheel 3 drive the first and second star plates 9, 10 in the same direction and in synchrony, thus maintaining the angular offset. In this operating mode of the transport device 1, the coupling 19 is no longer required.

In another embodiment, only one of the first and second motors 14, 18 drives the transport star wheel 3. Since only one of the star plates 9, 10 is actually being driven, there must be a way to ensure that the other star plate also moves. In this operating mode, the coupling 19 maintains a rigid connection after the relative positions of the first and second star plates 9, 10 have been set.

The hollow column 4 protects more than just the drive that transports the containers. In fact, the hollow column 4 also protects the entire adjustment mechanism that is used for adjusting the container receptacles so that they can accommodate different sized containers. Both the drive and the adjustment mechanism are thus contained within the hollow column 4. As a result, the hollow column 4 protects the adjustment mechanism from outside influences, in particular, against glass shards, and the disruptions caused thereby. In addition, a transport device 1 in which such components are sequestered within the hollow column can more easily meet hygiene and cleaning requirements.

Both the adjustment of the container receptacles 6 and the setting of the angular offset of the first and second star plates 9, 10 are carried out by appropriate software for controlling the first and/or second motors 14, 18 based on the container diameters.

The first motor 14 is arranged to be stationary in the hollow column 4 relative to its power supply. The second motor is arranged to be stationary in the hollow column relative to its stator winding. Accordingly, no electrical rotating mmf or slip ring distributor is required for the power supply for the first and second motors 14, 18.

All function elements required for the bearing mounting of the first and second star plates 9, 10, in particular the inner bearing 15 and the outer bearing 17, are also located entirely inside the hollow column 4. As such, they are protected against outside influences and isolated from the hygiene region of the transport device 1 or from the hygiene region of a system comprising the transport device 1.

Figure 3:
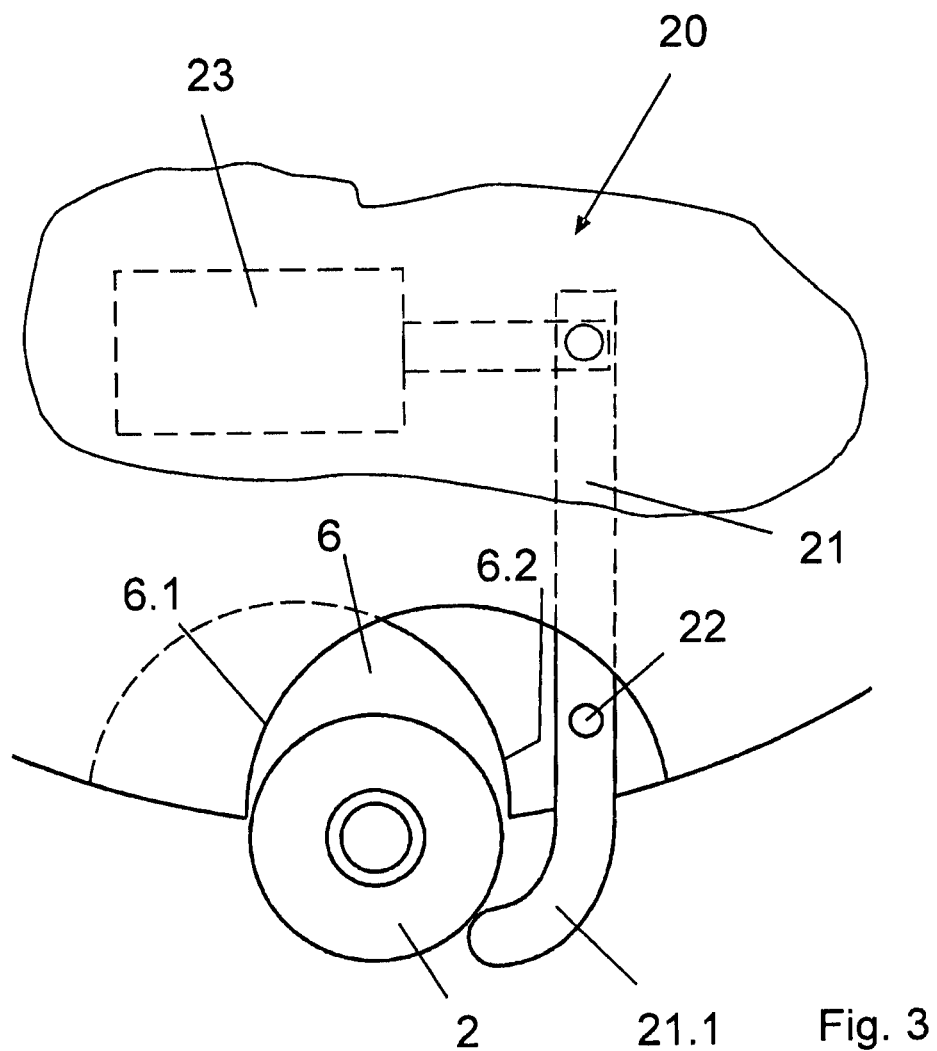
FIG. 3 shows details of a receptacle in another embodiment of a transport device.

In an alternative embodiment, shown in FIG. 3, the container receptacle 6 has an associated gripper arrangement 20 to secure the container 2. The gripper arrangement 20 includes a gripper arm 21 that rotates about a pivot point 22 adjacent to a trailing flank 6.2 on the second star plate 10. The gripper arm 21 thus rotates around an axis that is parallel to the vertical axis VA.

An actuation element 23 associated with the gripper arrangement 20 causes the gripper arm 21 to transition between an effective position and a non-effective position. A suitable actuation element 23 is a pneumatic cylinder.

In the non-effective position, a gripper arm section 21.1 of the gripper arm 21 projects over the circumference of the star plate 10 outside its associated receptacle. In the illustrated embodiment, the gripper arm section 21.1 is curved like a hoe. The gripper arm section 21.1 is outside its associated container receptacle 6 so that it trails the container receptacle 6. In the effective position, the gripper arm section 21.1 contacts the circumferential region of the container 2 located outside the container receptacle 6, and secures it into the container receptacle 6.

Having described the invention, and a preferred embodiment thereof, what is claimed as new, and secured by letters patent is:

The invention claimed is:

1. An apparatus comprising a transport device for transporting a container, said transport device comprising a star wheel, a drive, bearings, a column, a machine frame, a plurality of receptacles, a plurality of first flanks, a plurality of second flanks, a first star wheel element, a second star wheel element, and a function element set, wherein said drive drives said star wheel about an axis perpendicular to a plane defined by said star wheel, wherein said star wheel is mounted on said bearings within said column, wherein said column is part of said machine frame, wherein said plurality of receptacles is disposed circumferentially about said star wheel, wherein at least a portion of said column is hollow, wherein said at least a portion of said column defines a first space and a second space, wherein said first space is inside said at least a portion of said column, wherein said second space is outside said at least a portion of said column, wherein each receptacle comprises one of said first flanks and one of said second flanks, wherein said first flanks lead in relation to a rotation direction of said star wheel, wherein said second flanks trail in relation to said rotation direction of said star wheel, wherein at least a portion of said second flank forms one of said receptacles from said plurality of receptacles, wherein each of said receptacles from said plurality of receptacles receives said container to be transported, wherein said star wheel comprises said first and second star wheel elements, wherein said plurality of first flanks is formed by said first star wheel element, wherein said plurality of second flanks is formed by said second star wheel element, wherein said first and second star wheel elements are adjustable about said axis perpendicular to said star wheel to define an angular offset between said first and second star wheel elements, wherein, during transport of said container, said drive rotates said first and second star wheel elements synchronously in a common direction while maintaining said angular offset, wherein said function element set comprises one or more function elements necessary for at least one of setting said angular offset and maintaining said angular offset, wherein said one or more function elements are selected from the group consisting of at least one of said bearings, a coupling, and said drive, wherein said one or more function elements is disposed entirely within said first space, and wherein, as a result, said column protects said one or more function elements from said second space.

2. The apparatus of claim 1, wherein said star wheel elements comprise plates.

3. The apparatus of claim 1, wherein said bearings comprise first bearings and second bearings, wherein said first and second bearings are mounted independently of each other, and wherein said first and second bearings are disposed within said first space.

4. The apparatus of claim 1, wherein said drive comprises a first electric motor and a second electric motor, where said first electric motor drives said first star wheel element, wherein said second electric motor drives said second star wheel element, wherein second electric motor is a torque motor, wherein said first electric motor is disposed in said first space, wherein said second electric motor is disposed in said first space, wherein said first electric motor is isolated from said second space, and wherein said second electric motor is isolated from said second space.

5. The apparatus of claim 4, further comprising a first shaft, a second shaft, a permanent magnet arrangement, and a stator winding, wherein said first shaft is coaxial with said axis, wherein said first star wheel element is connected to said first shaft so as to rotate with said first shaft, wherein said second star wheel element is connected to said second shaft so as to rotate with said second shaft, wherein said second shaft comprises a hollow shaft section, wherein said hollow shaft section of said second shaft surrounds said first shaft, wherein said first shaft and said second shaft are coaxial, wherein said first electric motor is connected to said first shaft to drive said first shaft, wherein said second electric motor is connected to said second shaft to drive said second shaft, wherein said stator winding is disposed in an interior of said column, wherein said stator winding is a constituent of said second electric motor, wherein said stator winding is disposed to interact with said permanent magnet arrangement, and wherein said permanent magnet arrangement is arranged in said second shaft.

6. The apparatus of claim 4, further comprising an angular-offset adjustment motor for causing an adjustment of an angular offset between said first star wheel element and said second star wheel element, wherein said angular-offset adjustment motor is selected from the group consisting of said first electric motor and said second electric motor.

7. The apparatus of claim 4, wherein said first electric motor and said second electric motor are configured to cooperate in transporting said container by being driven synchronously in a common direction so as to maintain a constant angular offset between said first star wheel element and said second star wheel element.

8. The apparatus of claim 4, wherein said first electric motor and said second electric motor, are configured to move said first and second star wheel elements relative to said column.

9. The apparatus of claim 1, further comprising a rigid coupling between said first star wheel element and said second star wheel element, wherein said rigid coupling is configured to maintain a constant angular offset between said first star wheel element and said second star wheel element.

10. The apparatus of claim 9, wherein said rigid coupling is accommodated within said first space so as to be protected from activity in said second space.

11. The apparatus of claim 9, wherein said rigid coupling comprises a coupling that switches between a first state and a second state, wherein, in said first state, said first and second star wheel elements are coupled together and wherein, in said second state, said first and second star wheel elements are movable independently of each other.

12. The apparatus of claim 11, wherein said rigid coupling couples said star wheel elements by coupling said first and second shafts.

13. The apparatus of claim 11, wherein said rigid coupling is configurable to transition between a first state and a second state, wherein in said first state said rigid coupling couples said first and second shafts, and wherein, in said second state, said first and second shafts are decoupled.

14. The apparatus of claim 11, wherein said rigid coupling is mechanical.

15. The apparatus of claim 11, wherein said rigid coupling is pneumatic.

16. The apparatus of claim 11, wherein said rigid coupling is electrical.

17. The apparatus of claim 1, further comprising an actuation device and a gripper arrangement, wherein said gripper arrangement comprises a gripper arm, wherein said gripper arrangement secures said container in a receptacle selected from said plurality of receptacles, wherein said actuating device moves said gripper arm between a first state and a second state, wherein, in said second state, said gripper arm secures said container in said receptacle.

18. The apparatus of claim 17, wherein said gripper arrangement is disposed on a star wheel element that forms one of said second flanks from said plurality of second flanks.

19. The apparatus of claim 17, wherein said gripper arm is pivotable between a first state in which said gripper arm trails an associated receptacle and a second state in said gripper arm engages behind said container and secures said container to said receptacle, wherein said gripper arm rotates in the direction of rotation of the star wheel when pivoting from said first position to said second position.

* * * * *